Jan. 7, 1958 R. HÖRTH 2,818,962
CONVEYOR BELT ADAPTED TO PASS THROUGH CURVES
Filed Oct. 4, 1954 5 Sheets-Sheet 3
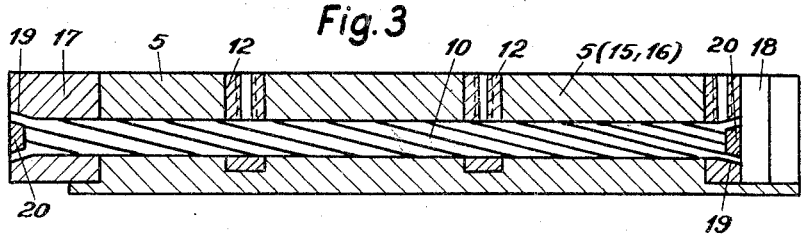
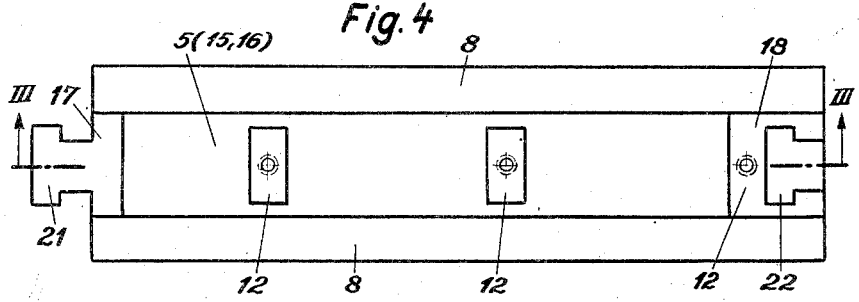
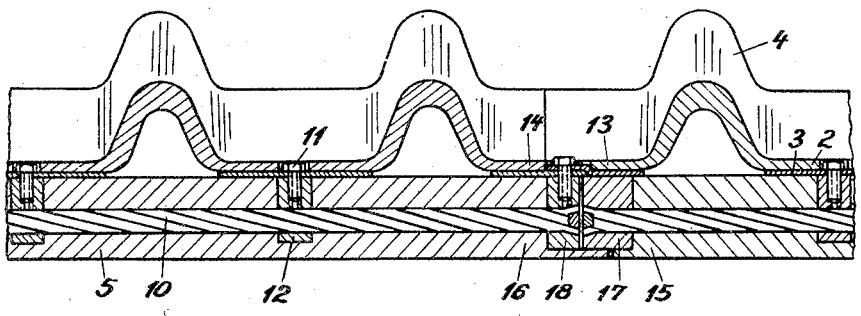
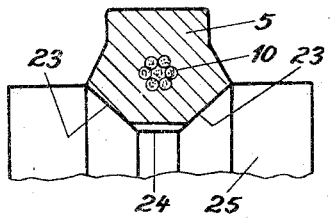
Inventor:
Robert Hörth Jan. 7, 1958 R. HÖRTH 2,818,962
CONVEYOR BELT ADAPTED TO PASS THROUGH CURVES
Filed Oct. 4, 1954 5 Sheets-Sheet 5

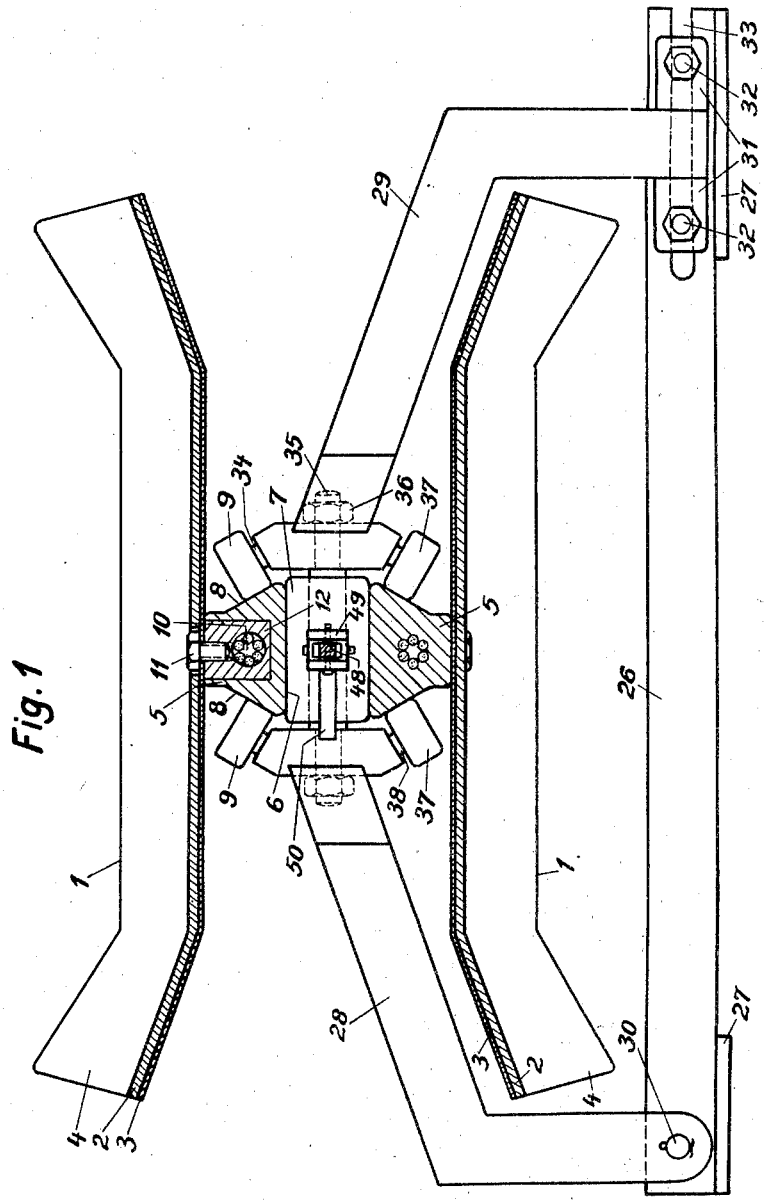

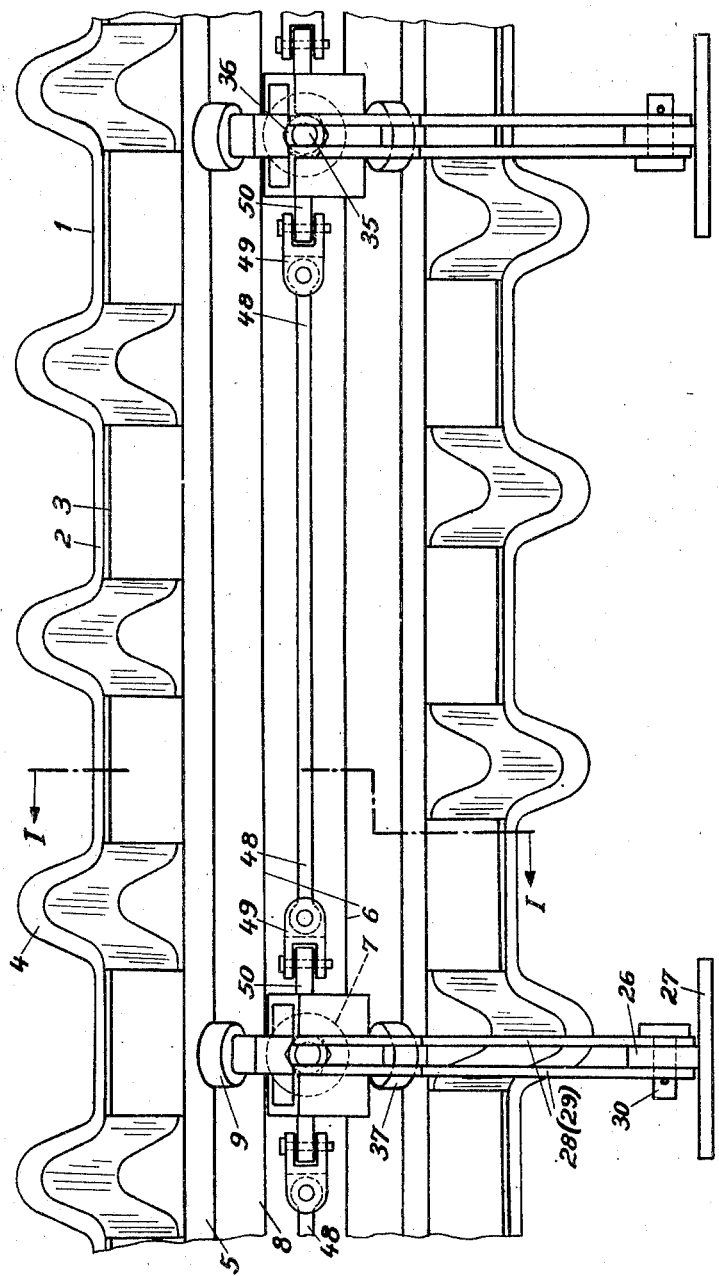

Inventor:
Robert Hörth
By
Patent Agent

United States Patent Office 2,818,962
Patented Jan. 7, 1958

2,818,962

CONVEYOR BELT ADAPTED TO PASS THROUGH CURVES

Robert Hörth, Vlotho-Kalldorf, Germany, assignor to Friedrich K. H. Stübbe, Vlotho (Weser), Germany Application October 4, 1954, Serial No. 460,195

Claims priority, application Germany October 10, 1953

16 Claims. (Cl. 198—137)

The present invention relates to conveyor belts, and, more particularly, concerns a conveyor belt adapted to pass through curves, which includes sections resistant against bending in transverse direction of the belt and is arranged on a pulling member extending along the central portion of the belt. The said belt furthermore comprises sections which are formed by flexible folds arranged between said first-mentioned sections.

It is an object of this invention to provide a conveyor belt of the above-mentioned type which will make it possible rigidly to connect the bend resistant sections with the pulling member while allowing the latter to twist about its longitudinal axis.

It is another object of this invention to provide a conveyor belt of the type set forth in the preceding paragraph which will make it possible without any difficulties to shorten or lengthen the conveyor belt as desired in conformity with the prevailing requirements.

It is still another object of this invention to provide a conveyor belt composed of alternately bend resisting sections and flexible folds in which the pulling member for the belt is supported by rollers which will support the pulling member in any angular position transverse to the belt and will be adapted to prevent the pulling member from turning about its longitudinal axis.

It is also an object of this invention to provide a conveyor belt of the type set forth in the preceding paragraph in which the conveyor belt may selectively be brought into any inclined position and in which the respective inclination may be increased from supporting rollers to supporting rollers.

The invention is illustrated by way of example in the accompanying drawings, in which:

Fig. 1 illustrates a cross-section taken along the line I—I of Fig. 2 through a conveyor belt adapted to pass through curves and provided with roller supports.

Fig. 2 is a side view of the conveyor belt according to Fig. 1.

Fig. 3 shows a longitudinal section through the pulling member, said section being taken along the line III—III of Fig. 4.

Fig. 4 is a top view of the pulling member according to Fig. 3.

Fig. 5 shows in longitudinal section corresponding to Fig. 3 two interconnected sections of the pulling member of Fig. 3 with the conveyor belt placed thereon.

Fig. 6 illustrates a cross-section similar to Fig. 1 of another embodiment of the pulling member.

General arrangement

Figure 7:
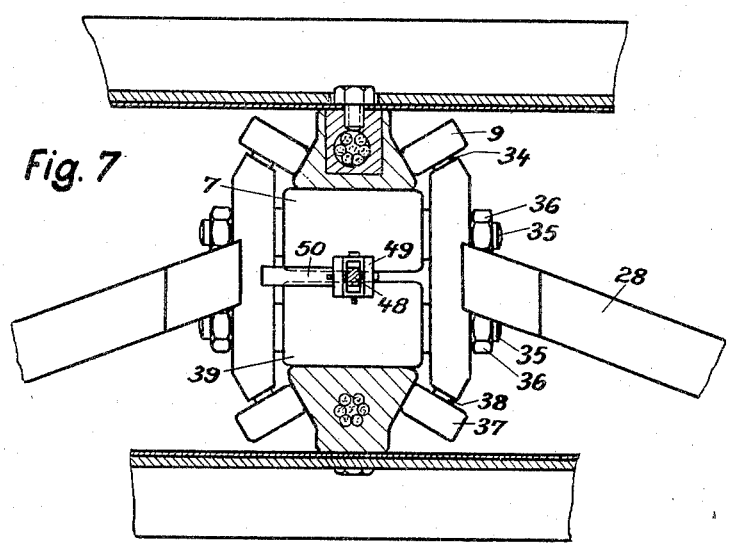
Figs. 7 to 9 represent further embodiments of the roller support corresponding to the illustration of Fig. 1.

The invention consists primarily in that those sections of the conveyor belt which are resistant against bending are rigidly connected to the pulling member, and that the pulling member is flexible, twistable about its longitudinal axis, has a core which is inextensible in longitudinal direction of said pulling member, and is provided with running surfaces for sets of rollers which are spaced from each other and are arranged in roller supports. The rollers of said sets of rollers are arranged relative to each other and in such distances that they are able to carry the pulling member and to prevent its twisting about its longitudinal axis in any angular position transverse to the longitudinal direction of the belt, preferably also when the pulling member is turned by 180°.

Preferably the pulling member has a substantially trapezoidal cross-section and may be made for instance from rubber preferably with an inserted wire cable forming the core of said pulling member.

According to a further development of the invention, the pulling member of such belts which are composed of sections consists of correspondingly long interconnected sections so that the conveyor belt may be shortened or lengthened as desired in conformity with prevailing requirements.

The roller supports for the conveyor belt may be so designed that the roller carries on the roller support are displaceable or tiltable transverse to the conveyor belt. In this way, between the roller supports placed at normal distances from each other, further roller supports may be arranged without having to open the belt. This is of particular importance when the belt passes through curves with a small radius.

Structural arrangement

Referring now to the drawings in detail and Figs. 1 and 2 thereof in particular, the structure shown therein comprises a conveyor belt 1 adapted to pass through curves. This conveyor belt comprises sections resistant against bending in transverse direction of the belt which are composed of a rubber cover 2 vulcanized to a reinforcing plate 3. The belt furthermore comprises flexible trough-like folds 4 made of rubber. The conveyor belt is equipped with a pulling member 5 of substantially trapezoidal cross-section which is provided with running surfaces 6, 8 for supporting rollers 7, 9. The pulling member 5 is made of rubber and is provided with an inserted wire cable 10 which is flexible and is inextensible in longitudinal direction of the belt and serves as a core.

The parts 2 and 3 of the belt 1 are resistant against bending and are detachably connected to the pulling member 5 by means of screws 11. These screws 11 are screwed into threaded bushings 12 in the pulling member 5 (Figs. 1, 3 and 4). The threaded bushings 12 have their lower end provided with a bore (Fig. 3) through which the core 10 is passed.

The core 10 and the threaded bushings 12 may be vulcanized into the pulling member 5.

The conveyor belt according to Fig. 5 consists of individual detachably interconnected sections 13, 14 so that the belt may be lengthened and shortened as desired. Accordingly, also the pulling member is composed of sections 15, 16 (Figs. 3, 4 and 5) which are detachably interconnected by a bayonet type joint 17, 18. The connecting members 17, 18 are provided with a bore 19 which conically widens toward the outside. The ends 20 of the core 10 are passed through the bore 19 and connected thereto by casting metal therearound. When connecting the sections 15, 16, the closure member 17 provided with a hammer-shaped head 21 has the latter engage a correspondingly shaped groove 22 of the closure part 18, said hammer-shaped head comprising a threaded bushing 12 so that after the belt sections 13, 14 have been screwed on, the closure arrangement cannot be loosened any longer.

The pulling member 5 illustrated in Fig. 6 has its underside arranged in a V-belt-like manner, while its surfaces 23 rest in a tapered groove 24 of the driving drum 25 so that an increased adhering friction will be obtained.

The roller supports (Figs. 1 and 2) are composed of a base 26 provided with base plates 27, and roller carriers 28 or 29. The roller carrier 28 illustrated in the left portion of Fig. 1 is tiltably connected to the base 26 by means of a bolt 30. The roller carrier 29 on the right-hand side of Fig. 1 is provided with fishplates 31 through which extend tensioning screws 32. These tensioning screws 32 are adapted to slide in a slot 33 open at one end and arranged on the base 26 so that the roller carrier 29 is slidable on the base 26 and can be arrested by tightening the tensioning screws 32. Rollers 9 are journaled on axle necks 34 of the roller carriers 28, 29 respectively. Between the said two roller carriers there is arranged the roller 7 having a shaft 35. By means of said shaft 35, the ends of which are provided with threads, and the nuts 36, the roller carriers are detachably connected with each other. The roller carriers are provided with axle necks 38 and rollers 37 for the nonconveying portion of the belt. These necks 38 and rollers 37 are arranged in an image-like manner to the necks 34 and rollers 9 respectively for the respective conveying portion of the belt. When the non-conveying or idle portion of the belt is not returned below the conveying portion of the belt, the rollers 37 will, of course, be superfluous.

With the roller support shown in Fig. 7, a separate roller set 37, 39 for the non-conveying portion of the belt is arranged below the roller set 7, 9 for the conveying portion of the belt.

Figure 8:
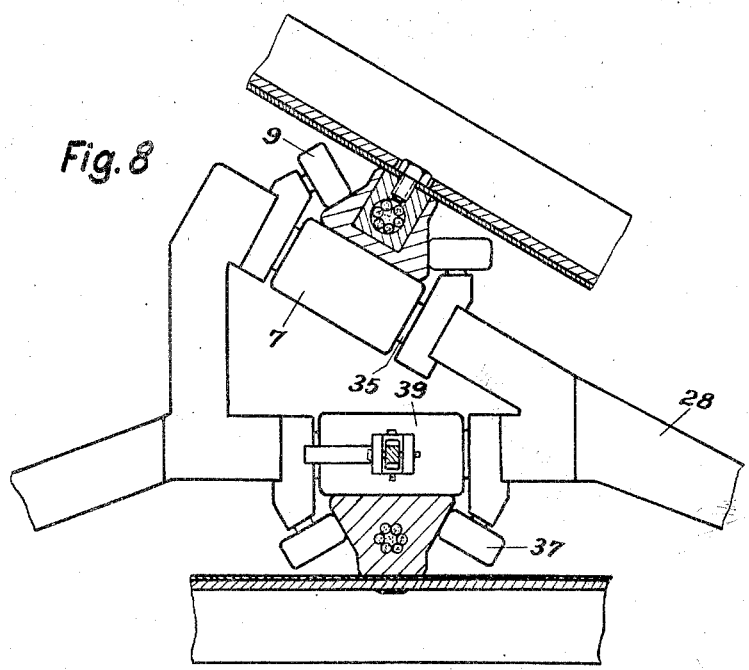

Fig. 8 illustrates a roller support in which the roller set 7, 9 for the conveying portion of the belt is so arranged that said conveying portion is inclined in a direction transverse to the longitudinal direction of the conveyor belt.

Such roller supports may be employed when the belt is not intended at a reversing point to discharge overhead but is intended at a desired place of the conveying path to discharge laterally.

Figure 9:
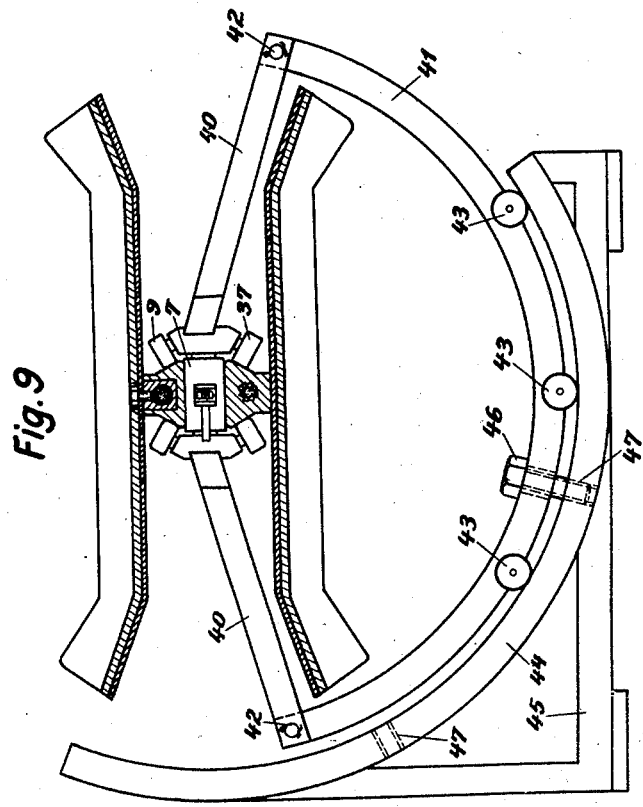

A further embodiment of the roller support is illustrated in Fig. 9. The roller carriers 40 are by means of bolts 42 pivotally connected to a circularly arch-shaped base 41 which is provided with rollers 43 running on a circularly arch-shaped raceway 44 of a support 45. In this way the conveyor belt can easily be adjusted in its transverse direction for different inclinations in which it can be held by means of a set screw 46 which passes through a bore in base 41 and engages threaded bores 47 of the raceway 44. If the raceway 44 is provided with teeth, and if the circularly shaped base 41 is provided with a pawl adapted to be tilted into or out of engagement with said teeth, the conveyor belt can be brought into any desired inclined position, and the inclination of a roller support relative to another roller support can easily be increased.

The roller supports are in longitudinal direction of the conveyor belt 1 pivotally connected with each other by supports 48 which are pressure-resistant (Figs. 1, 2, 7, 8 and 9). The ends of the supports 48 are provided with universal joints 49 which by means of plates 50 are connected with one of the roller carriers 28 or 29 respectively.

It is, of course, understood that the present invention is, by no means, limited to the particular construction shown in the drawings, but also comprises any modifications within the scope of the appended claims.

What I claim is:

1. In a conveyor arrangement: a conveyor belt comprising a plurality of first belt portions resistant against bending in transverse direction of said belt and a plurality of flexible second belt portions connected to said first belt portions and of a channel-like shape with the channel extending in transverse direction of said belt, the arrangement being such that said first and second belt portions alternate with each other, a flexible pulling member extending in longitudinal direction of said belt and being fastened to said first belt portions, said pulling member being twistable about its longitudinal axis and being provided with three running surfaces triangularly arranged with regard to each other and extending in longitudinal direction of said belt, said pulling member being substantially inextensible in longitudinal direction thereof, a plurality of supporting stands arranged in spaced relationship to each other, and a plurality of rollers stationarily supported by said stands and arranged for rolling engagement with said triangularly arranged surfaces.

2. A conveyor arrangement which includes in combination: a conveyor belt comprising first sections spaced from each other and resistant against bending in transverse direction of said belt, said belt also comprising flexible second sections of channel-like shape with the channel extending transverse to the longitudinal direction of said belt, said second sections being respectively interposed between and interconnecting said first sections, a flexible pulling member of substantially trapezoidal cross section extending in longitudinal direction of said belt and having said first sections firmly connected thereto, said pulling member being twistable about its longitudinal axis and being provided with three running surfaces triangularly arranged with regard to each other and extending in longitudinal direction of said belt, two of said running surfaces being arranged on opposite sides thereof with regard to the longitudinal plane of symmetry of said pulling member, core means embedded in said pulling member and substantially inextensible in longitudinal direction thereof, a plurality of supporting stands arranged in spaced relationship to each other, and a plurality of rollers stationarily supported by said stands and arranged for rolling engagement with said triangularly arranged surfaces.

3. A conveyor arrangement which includes in combination: a conveyor belt comprising first sections spaced from each other and resistant against bending in transverse direction of said belt, said belt also comprising second sections respectively interposed between and interconnecting said first sections, said second sections respectively including channel-like portions with the axes of said channels extending transverse to the longitudinal direction of the belt, rotatable driving means provided with a groove of V-shaped cross section, a flexible pulling member extending in longitudinal direction of said belt and having said first sections firmly connected thereto, said pulling member being twistable about its longitudinal axis and being provided with three running surfaces triangularly arranged with regard to each other and extending in longitudinal direction of said belt and also being provided with tapering side wall portions corresponding to the contour of said groove for engaging the same, core means embedded in said pulling member and substantially inextensible in longitudinal direction thereof, a plurality of supporting stands arranged in space relationship to each other, and a plurality of rollers stationarily supported by said stands and arranged for rolling engagement with said triangularly arranged surfaces.

4. An arrangement according to claim 3, in which the pulling member consists primarily of rubber.

5. An arrangement according to claim 3, in which the core means includes wire strands.

6. In a conveyor arrangement: a conveyor belt composed of a plurality of belt sections detachably connected to each other, each of said belt sections comprising a first portion resistant against bending in transverse direction of said belt, and a flexible second portion connected to said first portion and of a channel-like shape with the longitudinal axis of said channel transverse to the longitudinal extension of said belt, the arrangement being such that said first and second portions alternate with each other, a flexible pulling member extending in longitudinal direction of said belt and being fastened to said first portions, said pulling member being composed of a plurality of detachably interconnected sections and being twistable about its longitudinal axis and furthermore being provided with three running surfaces triangularly arranged with regard to each other and extending in longitudinal direction of said belt, core means embedded in said pulling member and substantially inextensible in longitudinal direction thereof, a plurality of supporting stands arranged in spaced relationship to each other, and a plurality of rollers stationarily supported by said stands and arranged for rolling engagement with said triangularly arranged surfaces.

7. In a conveyor arrangement: a conveyor belt comprising a plurality of first belt portions resistant against bending in transverse direction of said belt and a plurality of flexible second belt portions connected to said first belt portions and of a channel-like shape with the channel extending in transverse direction of said belt, the arrangement being such that said first and second belt portions alternate with each other, a flexible pulling member extending in longitudinal direction of said belt and composed of a plurality of detachably interconnected sections firmly connected to said first belt portions, bayonet joint means respectively detachably interconnecting each two adjacent ends of said pulling member sections and respectively connected to the adjacent end portions of said core means, said pulling member being twistable about its longitudinal axis and being provided with three running surfaces triangularly arranged with regard to each other and extending in longitudinal direction of said belt, core means embedded in said pulling member and substantially inextensible in longitudinal direction thereof, a plurality of supporting stands arranged in spaced relationship to each other, and a plurality of rollers stationarily supported by said stands and arranged for rolling engagement with said triangularly arranged surfaces.

8. A roller support for supporting a conveyor belt having connected thereto pulling means provided with running surfaces triangularly arranged with regard to each other and adapted to pass through curves, which comprises in combination: base means; a first arm adjustably connected to said base means; a second arm adjustably connected to said base means, said first arm and said second arm being adjustable in a plane perpendicular to the longitudinal direction of said belt; means detachably interconnecting said arms, and roller means arranged between and supported by said arms for engagement with said running surfaces to thereby support said pulling means and thus said belt.

9. A roller support according to claim 8, in which at least one of said arms is pivotally connected to said base means.

10. A roller support according to claim 8, in which at least one of said arms is slidably connected to said base means.

11. A roller support for supporting an endless conveyor belt adapted to pass through a curve and having connected thereto endless pulling means provided with running surfaces triangularly arranged with regard to each other so that one respective portion of said pulling means at one time forms an upper pulling means section while at the same time another respective portion of the pulling means forms a lower pulling means section, which comprises in combination: base means, a first arm adjustably connected to said base means at one end of said arm, a second arm adjustably connected to said base means at one end portion of said second arm, said arms being adjustable in a plane transverse to the longitudinal direction of said belt, bolt means detachably interconnecting the other end portions of said arms, first roller means rotatably supported by said bolt means for engagement with a running surface of an upper pulling means section and at the same time with a running surface of a lower pulling means section, and additional roller means respectively supported by said arms for engagement with the other running surfaces of said pulling means.

12. A roller support for supporting an endless conveyor belt adapted to pass through a curve and having connected thereto endless pulling means provided with running surfaces triangularly arranged with regard to each other, said pulling means being arranged so that one respective portion of said pulling means at one time forms an upper pulling means section while at the same time another respective portion of the pulling means forms a lower pulling means section, which comprises in combination: base means, a first arm adjustably connected to said base means at one end of said arm, a second arm adjustably connected to said base means at one end portion of said second arm, said arms being adjustable in a plane transverse to the longitudinal direction of said belt, first roller means carried by the other end portion of said first arm, second roller means carried by the other end portion of said second arm, said first and second roller means being arranged respectively to engage two oppositely located longitudinal running surfaces of the respective upper section of said pulling means, means detachably interconnecting said arms, third roller means interposed between said arms and arranged to engage the third running surface of the respective upper section of said pulling means and the oppositely located running surface of the respective lower section of said pulling means, fourth roller means also carried by said first arm and arranged in the manner of an image of said first roller means, and fifth roller means also carried by said second arm and arranged as an image of said second roller means, said fourth and fifth roller means being arranged for engagement with the other two running surfaces of the respective lower section of said pulling means.

13. An arrangement according to claim 12, which includes sixth roller means supported by said arms and arranged below said third roller means for engagement with the inner surface of the respective lower section of said pulling means.

14. A roller support for supporting an endless conveyor belt adapted to pass through a curve and having endless pulling means connected thereto so that one respective portion of said pulling means at one time forms an upper pulling means section while at the same time another respective portion of the pulling means forms a lower pulling means section, which comprises in combination: base means, a first arm connected to said base means, a second arm connected to said base means, a first roller set supported by said arms and comprising two rollers respectively engaging opposite longitudinal sides of said upper pulling means section, said first roller set also comprising a third roller engaging the bottom of said upper pulling means section, the axis of said third roller being inclined with regard to the horizontal plane and being located in a plane substantially transverse to the longitudinal direction of said belt, and a second roller set supported by said arms and respectively engaging opposite longitudinal sides of said lower pulling means section, said second roller set also comprising a further roller engaging the inwardly directed surface of said lower pulling means section.

15. A roller support for supporting a conveyor belt having pulling means connected thereto and being adapted to pass through curves, which comprises in combination: stationary arched guiding means, supporting means having an arched portion conforming to said guiding means, and roller means supported by said supporting means and arranged for engagement with the side and bottom surfaces of said pulling means, said arched portion being adjustable relative to said stationary guiding means for adjusting said roller means angularly in a plane substantially transverse to the longitudinal direction of said belt.

16. In a roller support system for a conveyor belt: flexible twistable pulling means provided with running surfaces triangularly arranged with regard to each other and adapted to pass through curves, said triangularly arranged running surfaces extending in longitudinal direction of said belt, both said belt and said pulling means being firmly connected to each other, and said belt and said pulling means being each composed of detachably interconnected sections, a plurality of supporting stands spaced from each other, a plurality of rollers respectively stationarily supported by said stands and engaging said triangularly arranged running surfaces of said pulling means, and rod means pivotally interconnecting said stands.

References Cited in the file of this patent

UNITED STATES PATENTS

| | | |
|---|---|---|
| 2,383,932 | Brunner | Sept. 4, 1945 |
| 2,701,050 | Steinborn | Feb. 1, 1955 |

FOREIGN PATENTS

| | | |
|---|---|---|
| 834,366 | Germany | Mar. 20, 1952 |